United States Patent [19]
Wu

[11] Patent Number: 6,092,024
[45] Date of Patent: Jul. 18, 2000

[54] METHOD AND APPARATUS FOR DETERMINING RESISTIVITY AND DIELECTRIC ANISOTROPY PARAMETERS OF EARTH FORMATIONS BY USING MULTIFREQUENCY AND/OR MULTISPACING MEASUREMENTS

[75] Inventor: Jian-Qun Wu, Houston, Tex.

[73] Assignee: Baker Hughes Incorporated, Houston, Tex.

[21] Appl. No.: 09/052,462

[22] Filed: Mar. 31, 1998

Related U.S. Application Data

[60] Provisional application No. 60/042,682, Apr. 3, 1997.

[51] Int. Cl.$^7$ ........................................... G01V 3/26
[52] U.S. Cl. ........................................................ 702/7
[58] Field of Search .................................. 324/338, 339; 702/7

[56] References Cited

U.S. PATENT DOCUMENTS

| | | | |
|---|---|---|---|
| 5,329,448 | 7/1994 | Rosthal . | |
| 5,656,930 | 8/1997 | Hagiwara . | |
| 5,811,973 | 9/1998 | Meyer, Jr. | 324/338 |
| 5,869,968 | 2/1999 | Brooks et al. | 324/338 |
| 5,886,526 | 3/1999 | Wu | 324/338 |

OTHER PUBLICATIONS

"Effects of Formation Anisotropy on Resistivity–Logging Measurements", J.H. Moran and S. Gianzero, Society of Explortion Geophysicists, 1979, pp. 1266–1286.

"Response of 2–MHz LWD Resistivity and Wireline Induction Tool in Dipping Beds and Laminated Formations", Barbara Anderson, Stephen Bonner, Martin G. Luling and Richard Rosthal, SPWLA 31$^{st}$ Annual Logging Symposium, Jun. 24–27, 1990.

"Effects of Eccentering MWD Tools on Electromagnetic Resistivity Measurements", Jian–qun Wu, and Macmillan M. Wisler, SPWLA 35$^{st}$ Annual Logging Symposium, Jun. 24–27, 1990.

"The Effects of Rock Anisotropy on MWD Electromagnetic Wave Resistivity Sensors", Michael S. Bittar, Paul F. Rodney, SPWLA 35$^{th}$ Annual Logging Symposium, Jun. 19–22, 1994.

Processing and Modeling 2–MHz Resistivity Tools in Dipping, Laminated, Anistotropic Formations, Martin G. Luling, Richard A. Rosthal, Frank Shray, SPWLA 35$^{th}$ Annual Logging Symposium, Jun. 19–22, 1994.

"A New Method to Determine Horizontal–Resistivity in Anisotrophi Formations without Prior Knowledge of Relative Dip", T. Hagiwara, SPWLA 37$^{th}$ Annual Logging Symposium, Jun. 16–9, 1996.

Primary Examiner—Donald E. McElheny, Jr.
Attorney, Agent, or Firm—Madan, Mossman & Sriram P.C.

[57] ABSTRACT

An apparatus and a method for determining the conductivity and dielectric constants of an anisotropic formation uses a redundant set of electromagnetic measurements in combination with anisotropic formation models that relate the anisotropic conductivity and dielectric constant of the formation to measurements of a propagating electromagnetic wave in the formation. A conjugate gradient scheme or a Newton-Raphson algorithm is used to obtain solutions to the nonlinear equations of propagation. The solutions to the equations are usually non-unique and are also susceptible to measurement errors. Use of redundant measurements makes it possible to resolve the non-uniqueness. The redundancy is obtained by using multiple frequency and/or multiple spacing tools. The use of redundant measurements also makes it possible to reduce the error in the solution of the wave propagation equation.

21 Claims, 10 Drawing Sheets

METHOD AND APPARATUS FOR DETERMINING RESISTIVITY AND DIELECTRIC ANISOTROPY PARAMETERS OF EARTH FORMATIONS BY USING MULTIFREQUENCY AND/OR MULTISPACING MEASUREMENTS

CROSS REFERENCE TO RELATED APPLICATIONS

This application claims priority from U.S. Provisional Patent Application Ser. No. 60/042,682 filed on Apr. 3, 1997.

BACKGROUND OF THE INVENTION

The present invention relates in general to well-logging operations, and is particularly useful in anisotropic formations wherein electromagnetic induction measurements are sensitive to horizontal and vertical properties of the formation.

In oil and gas exploration, measurement-while-drilling or wireline systems are utilized to develop logs of the earth formation surrounding the borehole. In general, electrical logging apparatus includes: a transmission system that energizes the earth formations with either an electromagnetic field or currents, and at least one receiver system for monitoring the effect that the earth formations (and borehole) have on the field or current.

The electrical properties of the earth formation provide information about the geologic materials that makeup the formations, and about their likely oil, gas, and water content. In addition, the dielectric properties of the earth formations are also of interest.

Some earth formations are isotropic. In the present context, this means that the effect that the formation has on an incident electromagnetic wave is independent of the direction of propagation of the incident wave. Other formations are anisotropic, which means that the earth formation may have a greater conductivity or dielectric constant in one direction than in another. This is particularly true of many sedimentary geologic formations in which the current flows more readily in a direction parallel to the bedding plane than in other directions due to the fact that a number of mineral crystals are flat or elongated, and they preferentially align with their long direction parallel to the sedimentary bedding plane at the time of deposition.

In oil and gas exploration, the anisotropy of earth formations can be expressed as the ratio of the horizontal and vertical property of interest. A commonly used model for the subsurface assumes that the formation is transversely isotropic ("TI"), characterized by a single axis of infinite symmetry. In such a medium, the properties in the direction of the symmetry axis are different from the properties in any direction perpendicular to the symmetry axis. It is assumed here that the axis of symmetry is vertical and perpendicular to the bedding plane of the formation. Cases where this assumption is not true can be handled in ways that would be familiar to those knowledgeable in the art.

For electrical properties of subsurface formations, a commonly used anisotropy factor is $$\lambda = \sqrt{\frac{\sigma_\beta}{\sigma}}, \tag{1}$$

where $\sigma^h$ and $\sigma_v$ are the horizontal and vertical conductivities of the formation. In situations where the borehole intersects the formations substantially perpendicular to the bedding planes, conventional induction and propagation well logging tools are sensitive almost exclusively to the horizontal component of the formation resistivity.

The determination of horizontal and vertical conductivities is complicated in directional drilling wherein the boreholes are inclined to the bedding plane. In such a case, the tool readings contain an influence from the vertical as well as the horizontal conductivity. The inclination of the borehole axis to the normal to the bedding plane is, in general, not known precisely.

Moran discusses a method for modeling the effect of formation anisotropy on resistivity logging measurements and shows that, in principle, values of horizontal and vertical conductivities can be derived from the measured values of the amplitude and phase of the induction-logging conductivity signal.

Rosthal (U.S. Pat. No. 5,329,448) discloses a method for determining the horizontal and vertical conductivities from a propagation or induction well logging device. The method assumes that $\theta$, the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

The relevant wave-number that governs the propagation of electromagnetic waves is given by an expression of the form $$k^2 = \epsilon\mu\omega^2 + i\sigma\mu\omega \tag{2}$$

where k is the wave number, $\epsilon$ is the dielectric constant, $\mu$ is the magnetic permeability, $\sigma$ is the conductivity and $\omega$ the angular frequency. In an anisotropic medium, $\epsilon, \mu$ and $\sigma$ are anisotropic quantities.

Hagiwara shows that the log response of an induction-type logging tool can be described by an equation of the form $$V \propto \frac{i}{L^3}(-2e^{ikL}(1-ikL) + ikL(e^{ikL\beta} - e^{ikL})). \tag{3}$$

In equation 3, V is the measured signal at a distance L from the source and $\beta$ is given by $$\beta^2 = \cos^2\theta + \lambda^2\sin^2\theta \tag{4}$$

and k is related only to the horizontal formation parameters.

Equation 3 is actually a pair of equations, one corresponding to the real part and one corresponding to the imaginary part of the measured signal, and has two unknowns. By making two measurements of the measured signal, the parameters k and $\beta$ can be determined. The two needed measurements can be obtained from (1) R and X signals from induction logs, (2) phase and attenuation measurements from induction tools, (3) phase or attenuation measurements from induction tools with two different spacings, or (4) resistivity measurements at two different frequencies. In the low frequency limit, $\epsilon$ can be neglected in equation 2 and from known values of $\omega$ and $\mu$, the conductivity $\sigma$ can be determined from k, assuming a value of $\mu$ equal to the permittivity of free space Equation 2 shows that the dielectric effect can be quite large at high frequencies. In relatively high resistivity (low conductivity) formations, like oil bearing sands, it can be seen from equation 2 that the impact of the dielectric effect can be quite large even at relatively low frequencies. The prior art methods do not take into account the effect of dielectric properties of the formation.

Those knowledgeable in the art would recognize that equation 3 is a nonlinear equation and may have more than one solution. The prior art methods do not address this possibility of nonuniqueness of solutions to the equation.

The hardware devices used in prior art typically make measurements of amplitude attenuation and phase differences. These methods cannot be made accurately. As would be known to those familiar with the art, these errors in measurement result in corresponding errors in the estimates of resistivity. Prior art methods are deficient in that they do not give any estimate of the reliability of the estimated resistivity.

There is a need for an invention that gives estimates of the anisotropic resistivity parameters of an underground formation while properly accounting for the effect of the dielectric constant of the formation on propagating electromagnetic waves. Such an invention should also provide estimates of the uncertainty in the estimated resistivity parameters in terms of uncertainties in the measurements made by the device. It is desirable that the invention make redundant measurements to reduce the uncertainties in the estimation of the formation parameters. It is also desirable that the invention take into account the nonuniqueness of possible solutions to the problem of determining the formation parameters from measured values of the propagating electromagnetic signal. The present invention satisfies these needs.

SUMMARY OF THE INVENTION

The present invention is an apparatus and a method for using electromagnetic measurements in a borehole in an anisotropic formation to determine the conductivity and dielectric constants that characterize the anisotropic formation. This is done by making redundant measurements using multiple frequency and/or multiple spacing tools in combination with anisotropic formation models that relate the anisotropic conductivity and dielectric constant of the formation to measurements of a propagating electromagnetic wave in the formation. The use of multiple frequency and/or multiple spacing tools makes it possible to resolve the non-uniqueness that is inherent in the solution of the wave propagation equation. The use of redundant measurements makes it possible to reduce the error in the solution of the wave propagation equation.

BRIEF DESCRIPTION OF THE FIGURES

The novel features of the invention are set forth in the appended claims, The invention itself as well as a preferred mode of use, further objectives and advantages thereof, are best understood by reference to the following detailed description of an illustrative embodiment when read in conjunction with the accompanying drawings.

DETAILED DESCRIPTION OF THE INVENTION

This invention incorporates many features of the invention that is the subject of copending application 60-029394 filed on Oct. 30, 1996 with the same inventor and having the same ownership. Copending application Ser. No. 60-029394 is incorporated herein by reference.

It has been shown by Hagiwara that, using resistivity tools with axial dipole antennae, one can measure horizontal resistivity and a function $\beta$ given by equation 4. Without additional information, the vertical resistivity and relative angle cannot be uniquely determined, no matter how many antenna spacings are used. At higher frequencies, where the dielectric effect becomes important, even the horizontal resistivity cannot be determined with a single frequency measurement in deviated wells. The antenna measurements are affected by five formation parameters: two resistivities, two dielectric constants and the dip angle. Since the effects of dielectric constant and resistivity on wave number vary with frequency (equation 2), with measurements at two frequencies, it is possible to obtain four parameters. A constitutive relationship between the resistivity and the dielectric constant is needed to identify all five of the parameters.

Figure 1:
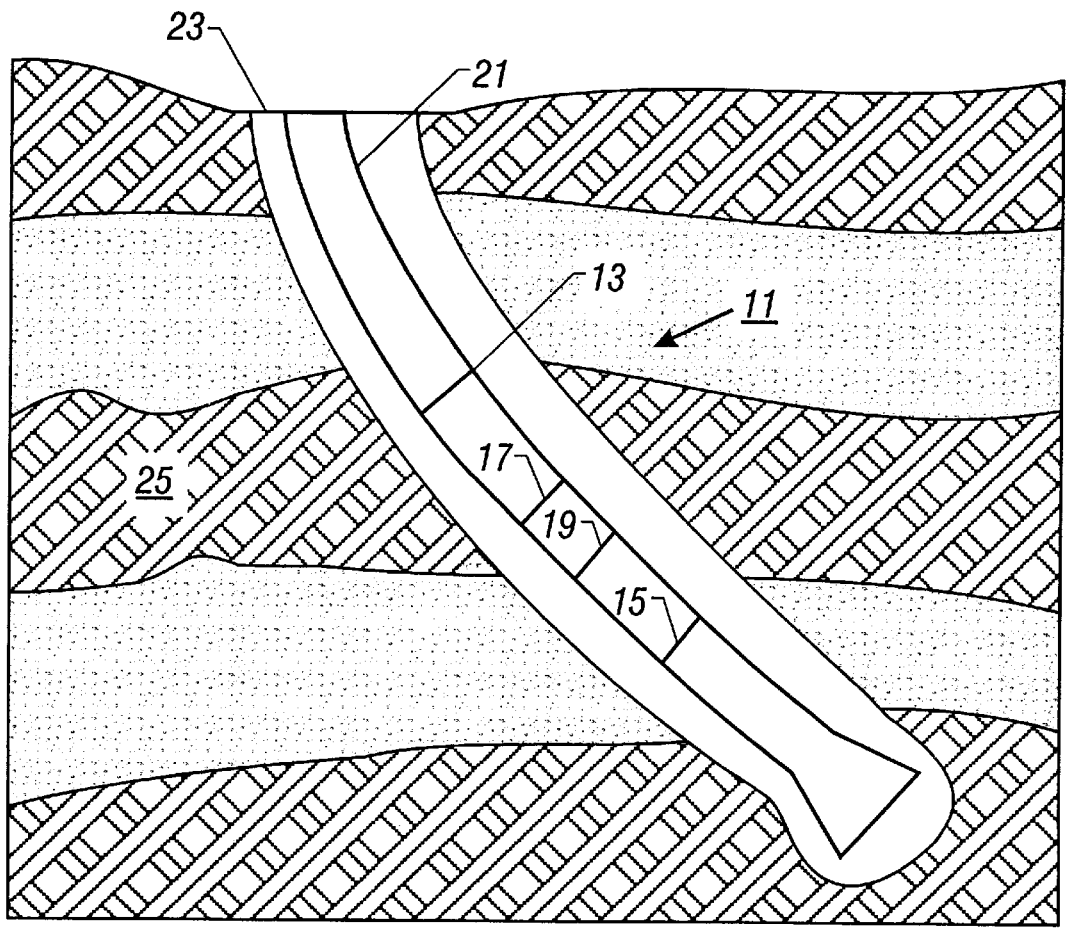
FIG. 1 is a drillstring that includes a logging-while-drilling system.

As depicted in FIG. 1, a logging-while-drilling system 11 is provided, and coupled to the drillstring 21 that extends into borehole 23. As show, the borehole 23 extends at an angle through the earth formation 25 that, for example, is composed of alternating layers of sand and shale deposits. It includes at least one transmitter 13, 15 for generating electromagnetic fields. Preferably, the at least one transmitter 13, 15 can generate electromagnetic fields having different frequencies. The logging while drilling system 11 also includes at least one receiver for detecting the effect of the earth formations (and borehole) on the electromagnetic fields. Preferably, a differential receiver is utilized which includes two spaced-apart antennas 17, 19 and reception circuitry for detecting the current induced in the receiver antennas 17, 19. Additional requirements on the various combinations of the number of transmitters and the number of frequencies that the transmitters are capable of generating are discussed below.

The log response of an induction tool with an axial dipole antenna to an anisotropic formation is given by $$V \propto \frac{1}{L^3}(-2e^{ik_hL}(1-ik_hL) + ik_hL(e^{ik_hL} - e^{ik_vS_1})) \qquad (5)$$

where L is the distance between the transmitter and the receiver, $$k_h^2 = \epsilon_h \mu \omega^2 + i\sigma_h \mu \omega \quad (6),$$

$$k_v^2 = \epsilon_v \mu \omega^2 + i\sigma_v \mu \omega \quad (7),$$

$$S_1^2 + x^2 + y^2 + \lambda^2 z^2 = L^2(\sin^2\theta + \lambda^2 \cos^2\theta) \quad (8),$$

$$k_v S = k_h L \beta \quad (9),$$

σ and ε are the conductivity and dielectric constant (the subscripts h and v refer to the horizontal and vertical values), x, y and z are the coordinates of the receiver referred to a coordinate system with the transmitter at the origin, L is the distance between the source and the receiver, θ is the angle between the borehole axis and the anisotropy symmetry axis, ω is the angular frequency and $\mu$ is the magnetic permeability of the medium.

The following observations may be made with respect to the solution of equations 5–9:

I. Equation 5 is actually a pair of equations since the measured response is a complex quantity and both the real and imaginary parts of the equation must be satisfied.

II. Given two measurements, it is possible to get a solution of equations 5–9 and obtain values of $k_h$ and β. The two measurements, as noted in the discussion on the background of the invention, could be obtained from
   a. a single spacing tool at single frequency and measuring the amplitude and phase of the received signal,
   b. a single spacing tool at two frequencies and measuring the amplitude or phase of the received signal,
   c. a dual spacing tool at a single frequency and measuring the amplitude or phase of the received signal.
   In the low frequency (or small ε) limit, the horizontal conductivity can be obtained from $k_h$ and equation 6. This was discussed by Hagiwara. What was not disclosed by Hagiwara is that the equations, being nonlinear, may have nonunique solutions and additional information is required to determine the correct solution.

III. With two pairs of independent measurements, it is possible to resolve the nonuniqueness of the solutions in II above. This is one of the novel features of this invention. The two pairs of independent measurements could come from using two different frequencies and two different transmitter-to-receiver spacings. One measurement could be common to each of the pairs of measurements used in the calculations, so that three measurements are sufficient to resolve the noninqueness of the solutions in II above.

IV. The solutions obtained under II or III have errors associated with them. These errors are related to errors in measuring the amplitudes and/or phases of the received signals and are determinable by a method given below. The errors obtained in II can be quite large, something not disclosed in prior art.

V. By making additional (redundant) measurements, it is possible to reduce the error in the estimated solution. This could be done in III, where four independent measurements are made, or, by making more than four measurements, using various combinations of multiple frequencies and multiple transmitter receiver distance. This is one of the novel features of the present invention.

VI. From independent knowledge of θ, or from other knowledge of a constitutive relationship between the dielectric constant and resistivity, it is possible to determine the parameters $\epsilon_h$, $\epsilon_v$, $\sigma_v$ and θ uniquely.

Figure 2:
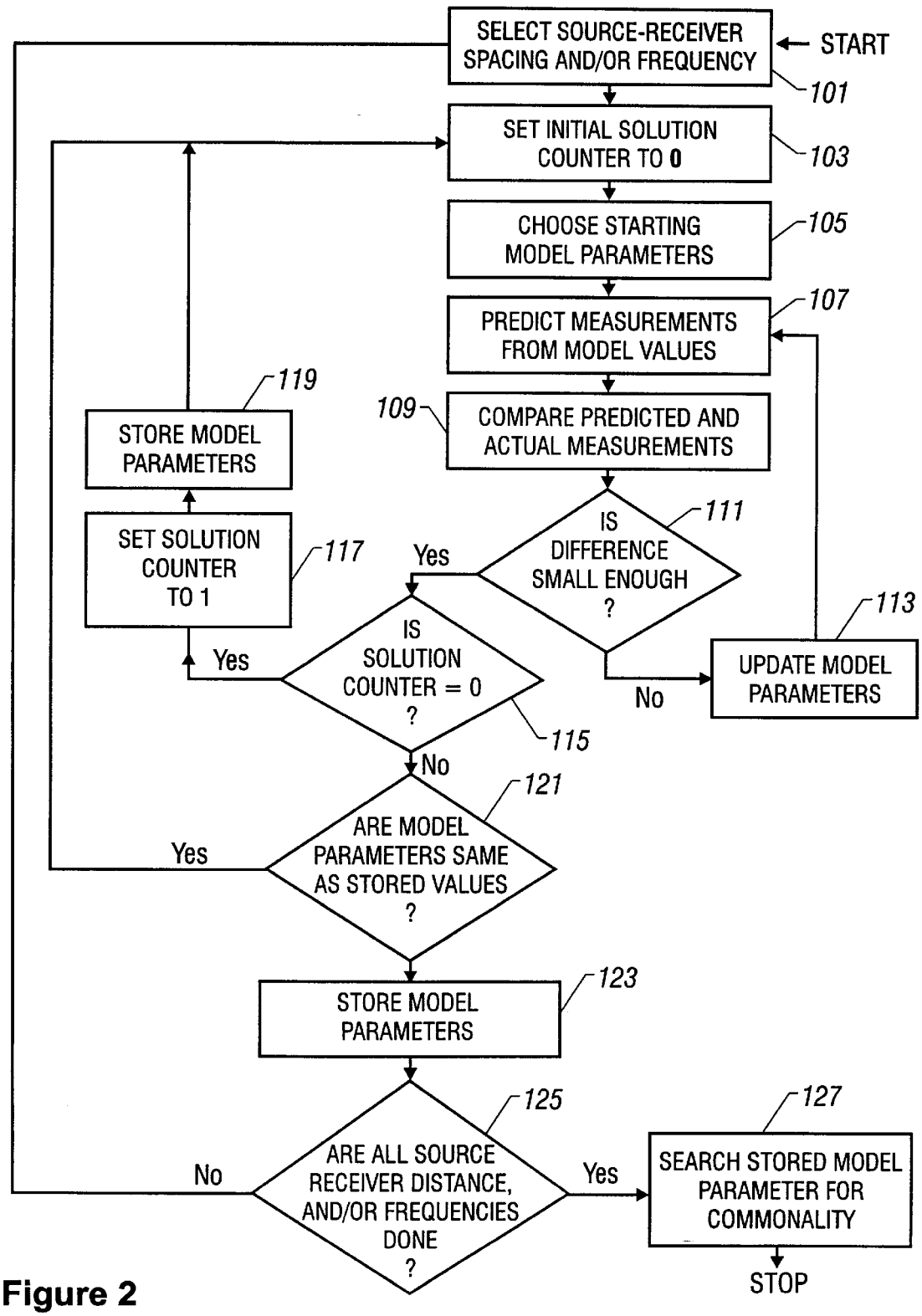
FIG. 2 is a flow chart illustrating some novel aspects of the present invention

With these comments in mind, attention is drawn to FIG. 2 which gives a schematic flow chart of a computer program implementing some of the novel features of the invention.

The first step of the process is to select a transmitter to receiver distance L and a transmitter frequency ω. The frequencies are chosen from a range including 20 kHz to 20 MHZ. In the preferred embodiment, the values used are 400 kHz and 2 MHZ. The transmitter to receiver spacing in the hardware device can be in the range of 0.1 m to 3 m. The step of selection of the tool parameters is shown at 101.

As pointed out above, for a particular value of L and ω, multiple solutions of the equations are possible. Accordingly, an initial solution counter is set equal to 0 at 103. The next step of the process is the selection of model parameters. This is done at 105. The nature of the parameters in the preferred embodiment is discussed below.

Based upon the model parameters, a prediction is made of the measurements that would be observed corresponding to the values of L and ω at 107. These predicted measurements are compared with actual measurements, obtained from the hardware device as discussed below at 109, to give an error. The difference between the measurements and the predicted measurements is quantified as the weighted sum of the squared error in amplitude and the squared error in phase. If the difference exceeds a predetermined value at 111, then the model parameters are updated at 113. A particular method of updating the model parameters based on a gradient technique is given below, but those knowledgeable in the art would recognize that other methods could also be used. These updated model values are then used again at 107 to make a new prediction of the measurements. This iterative process continues until the error at 111 is less than the specified value. At this point, an acceptable model has been found. A check is made at 115 to see if this is the first acceptable model for the chosen value of L and ω. If it is the first acceptable model, then the solution counter is set to I at 117, indicating that an acceptable solution has been found, the model parameters are stored at 119 and the process of finding a solution is started again with a new set of initial model parameters at 105.

When the test at 115 indicates that a prior, acceptable model solution exists, then a check is made to see if the model parameters are the same as previously stored model parameters, 121. If so, then the solution found is the same as a prior solution, and in accordance with the search for other nonunique solutions, the process of finding a solution is started again with a new set of initial model parameters at 105. If the test at 121 is that a new set of model parameters has been found, then these values are also stored, 123. A check is made, 125, to see if all values of L and ω have been used. If not, new values of L and ω are chosen and the process started again at 101.

Once all values of L and ω have been used, the stored model values are searched for uniqueness of solutions, 127. As shown in the example below, for a first frequency and a first distance L, two solutions for the model parameter exist because of the nonlinearity of the equations. For a different combination of frequency and distance L, two solutions will also exist but one of these solutions will be the same as one of the solutions for the first frequency and first distance. This common solution is the correct solution to the equations.

One method of implementation of the steps 103–111 discussed here is given in copending application Ser. No. 08/959,253 filed on Oct. 29, 1997 with the same inventor and having the same ownership. Another method of implementation of steps 103–111 is given herewith.

For the particular case where measurements are made of the amplitude ratio (AR) between the pair of receivers and the phase difference (PD) between the received signals at the two receivers, a Taylor series expansion of the amplitude ratio and the phase difference gives the following equations:

$$\Delta\sigma_h 20 \Re\left(\frac{\partial k_h}{\partial \sigma_h}\frac{\partial}{\partial k_h}\log_{10}\frac{V_1}{V_2}\right) + \Delta\sigma_h 20 \Re\left(\frac{\partial k_v}{\partial \sigma_v}\frac{\partial}{\partial k_v}\log_{10}\frac{V_1}{V_2}\right) = \Delta AR \quad (10)$$

and $$\Delta\sigma_h \frac{180}{\pi}\Im\left(\frac{\partial k_h}{\partial \sigma_h}\frac{\partial}{\partial k_h}\log_{10}\frac{V_1}{V_2}\right) + \quad (11)$$

$$\Delta\sigma_h \frac{180}{\pi}\Im\left(\frac{\partial k_v}{\partial \sigma_v}\frac{\partial}{\partial k_v}\log_{10}\frac{V_1}{V_2}\right) = \Delta PD$$

where $\Delta AR$ and $\Delta PD$ are changes in the amplitude ratio corresponding to changes $\Delta\sigma_h$ and $\Delta\sigma_v$ in the horizontal and vertical conductivities of the model. In equations 10 and 11, $\Re$ (.) and $\Im$(.) refer to the real and imaginary parts of the arguments. For a given set of model parameters, the signals $V_1$ and $V_2$ at the pair of receivers and the partial derivatives in equations 10 and 11 (and their real and imaginary parts) are readily computed, and, given the difference between the predicted and measured amplitude ratios and phase differences (the quantities on the right hand side of equations 10 and 11), the values of the model parameters are readily updated by inverting equations 10 and 11 to give changes $\Delta\sigma_h$ and $\Delta\sigma_v$ to be made to the model parameters. A Newton-Raphson scheme with successive linearization of the equations or a conjugate gradient scheme could be used to make iterative changes in the model parameters. These methods would be familiar to those knowledgeable in the art.

Those knowledgeable in the art would also recognize that to use a Newton-Raphson scheme or a conjugate gradient scheme for solution of nonlinear equations, an adequate sampling of initial starting points should be used to ensure that the gradient schemes will in fact finds all possible solutions. These methods for selection of initial starting points would be familiar to those knowledgeable in the art. In the present invention, the starting points at 105 in FIG. 2 are chosen to span the entire range of conductivities, dielectric constants and anisotropy factors to be expected. This is not an onerous task since information on the conductivities of subsurface formations and fluids is widely available.

Another aspect of the invention is the ability to get quantitative estimates of the reliability of the solution of the equations. In the preferred embodiment of the invention, equations 10 and 11 are used. Typical logging tools have accuracies of 0.05 degrees in phase measurement and 0.005 dB in measurement of relative amplitude. Using these for values of $\Delta PD$ and $\Delta AR$ on the right hand side of equations 10 and 11 and using the correct, common solution for the model parameters readily gives solutions for the errors in $\Delta\sigma_h$ and $\Delta\sigma_v$. The relative errors for each combination of L and $\omega$ will be a function of the resistivity and be different for different combinations of L and $\omega$ for a given value of resistivity. For example, denoting by $\chi_1$ and $\chi_2$ the errors in estimating a particular parameter, say $\sigma_h$, with two different combinations of L and $\omega$, the error in the joint estimation is given by $$\frac{1}{\chi^2} = \frac{1}{\chi_1^2} + \frac{1}{\chi_2^2}. \quad 12$$

This can lead to considerably more accurate estimation of the parameters since $\chi$ is clearly less than either $\chi_1$ or $\chi_2$. With additional measurements, the reliability is increased even further. An example of this reduction in the error of the estimated parameters is shown below.

In formations where the CRIM model (which is a model that relates resistivity to dielectric constant, as described in U.S. Pat. No. 5,144,245, "Method for Evaluating a Borehole Formation Based on a Formation Resistivity Log Generated by Wave Propagation Formation Evaluation Tool," to M. Wisler, and owned by Baker Hughes Incorporated, and incorporated herein by reference) applies, the dielectric constant is related to the formation conductivity by the equation $$\epsilon = c\sigma^a \quad (13),$$

where c and a are constants. At 2 MHZ, c=210 and a=−.43. at 400 KHz, a is slightly different and c is about twice its value at 2 MHZ. Since the dielectric effect at 400 kHz is much smaller than at 2 MHZ, it is a good approximation to assume both c and a as being independent of frequency. With these assumptions the values of β obtained as solutions to equations 5–9 can be inverted to get θ and $\sigma_v$,

TRANSMISSION AND RECEPTION SYSTEMS

Figure 3:
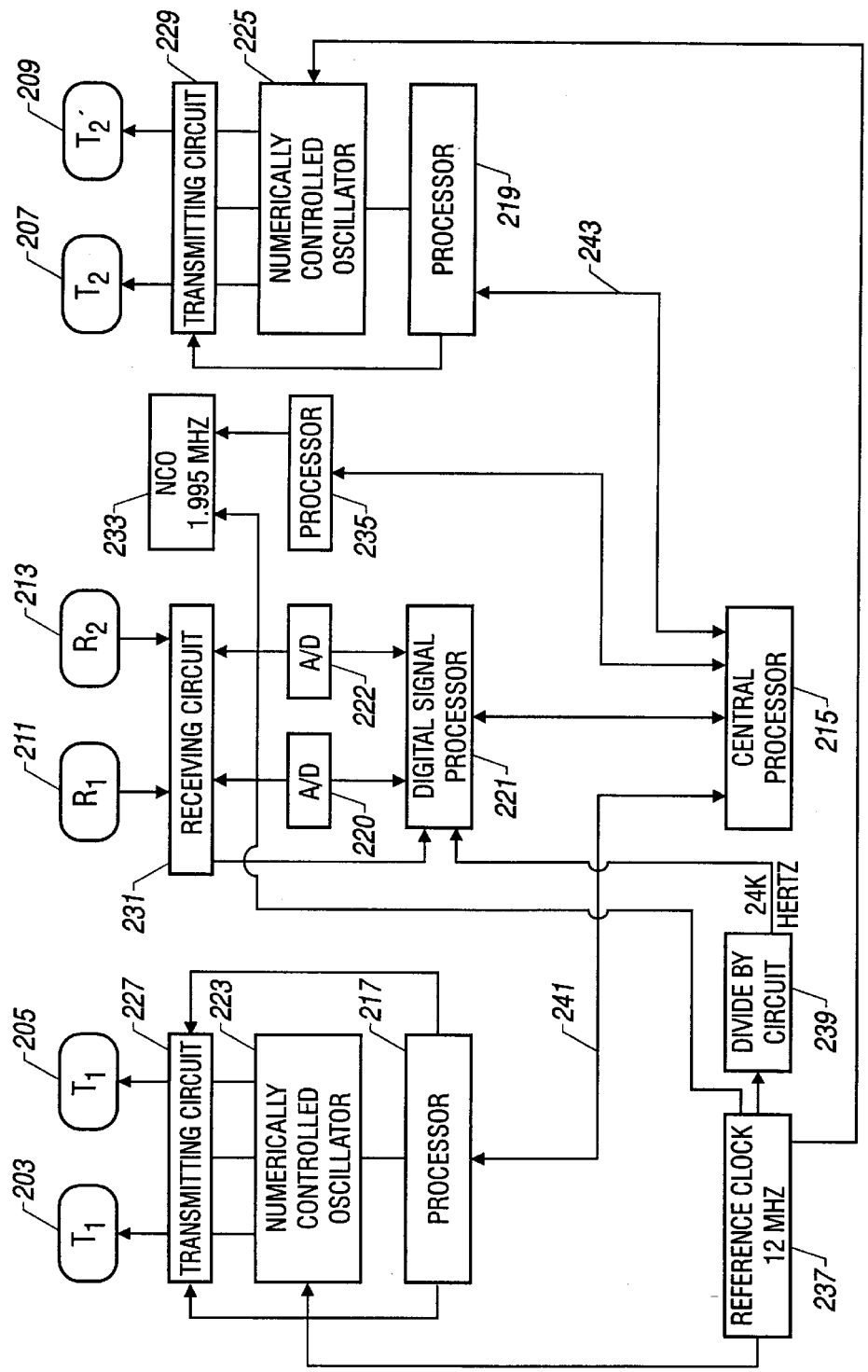
FIG. 3 is a block diagram of an exemplary logging tool.

FIG. 3 provides a block diagram view of an exemplary logging tool 201 constructed in accordance with the present invention. Logging tool 201 includes upper transmitters 203, 205, lower transmitters 207, 209, and intermediate series resonant receiving antennas 211, 213. Central processor 215 is preferably a microprocessor device which is utilized to coordinate the operation of the components of logging tool 201, to record and process the data obtained from measurements made by intermediate series resonant receiving antennas 211, 213, and to interact with the mud pulse telemetry data transmission system carried in the adjoining drill collar member. Processor 217 is provided and dedicated for the control of numerically controlled oscillator 223. Processor 219 is provided and dedicated for the control of numerically controlled oscillator 225. Central processor 215 communicates with processors 217, 219 via data buses 241, 243 respectively. Numerically controlled oscillators 223, 225 are adapted to receive a binary command signal as an input, and to produce an analog output having particular frequency, phase, and amplitude attributes. The frequency, phase, and amplitude attributes are determined at least in part by the command signals applied from processor 217, 219 to the input of numerically controlled oscillators 223, 225, and the data contained in various registers within numerically controlled oscillators 223, 225. Numerically controlled oscillators 223, 225 provide the analog signal to transmitting circuits 227, 229 respectively.

Receiving antennas 211, 213. communicate through analog receiving circuit 231 with the first and second data input channels of a digital signal processor 221. The digital signal processor 221 receives data at the first and second inputs after it is converted from analog form to digital form by analog-to-digital converters 220, 222 and records the data elements in a circular memory buffer. Central processor 215 pulls data from the buffers in a prescribed and predetermined manner in order to sample the current that is generated in receiving antennas 211, 213 in response to the propagation of electromagnetic signal through the adjoining formation. As is conventional, the resistivity of the formation surrounding the logging tool 201 may be determined by either (1) determining the amplitude attenuation of an electromagnetic wave propagating through the formation adjoining receiving antenna 211 and receiving antenna 213, or (2) by determining the phase shift between the electromagnetic signal propagating through the formation adjoining receiving antenna 211 and 213, or from both. These measurements comprise a relative measurement of the amplitude attenuation and a relative measure of the phase shift.

The present invention also allows other techniques for quantifying the electromagnetic field which propagates through the formation surrounding logging tool 201. Since precise control can be obtained with the present invention over the frequency, phase, and amplitude of the electromagnetic wave generated by transmitting antennas 203, 205, 207, and 209, the present invention allows the measurement of the absolute amplitude attenuation of electromagnetic signal between any particular transmitting antenna 203, 205, 207, and 209 and any particular receiving antenna 211, 213. Furthermore, the logging tool 201 of the present invention allows for the absolute measurement of the phase shift of an electromagnetic signal between any particular transmitting antenna 203, 205, 207, 209 and any particular receiving antenna 211, 213. Prior art devices do not allow such optional techniques for determining amplitude attenuation and phase shift, since prior art devices are unable to determine easily and precisely the frequency, phase, and amplitude of a signal generated at any particular transmitting antenna.

The operation of numerically controlled oscillators 223, 225 is clocked by the output of reference clock 237, which is preferably 12 MHZ. The operation of receiving circuit 231 is controlled by the output of numerically controlled oscillator 231, which is also clocked by the output of the reference clock 237, which is 12 MHz. Thus, a clocking pulse is provided to numerically controlled oscillator 223, 225 at a frequency identical to that which is provided to numerically controlled oscillator 223, which establishes the operating frequency of receiving circuit 231. Digital signal processor 221 is clocked by the output of divide-by circuit 239, and thus samples the output of receiving circuit 231 at a particular frequency which is much less than that utilized to energize transmitter antennas 203, 205, 207 and 209.

Numerically controlled oscillator 233 produces a phase-locked sine-wave signal with a center frequency of I 0.995 MHz, that is used as a local oscillator signal by receiving circuit located in electronics housing 73.

Figure 4:
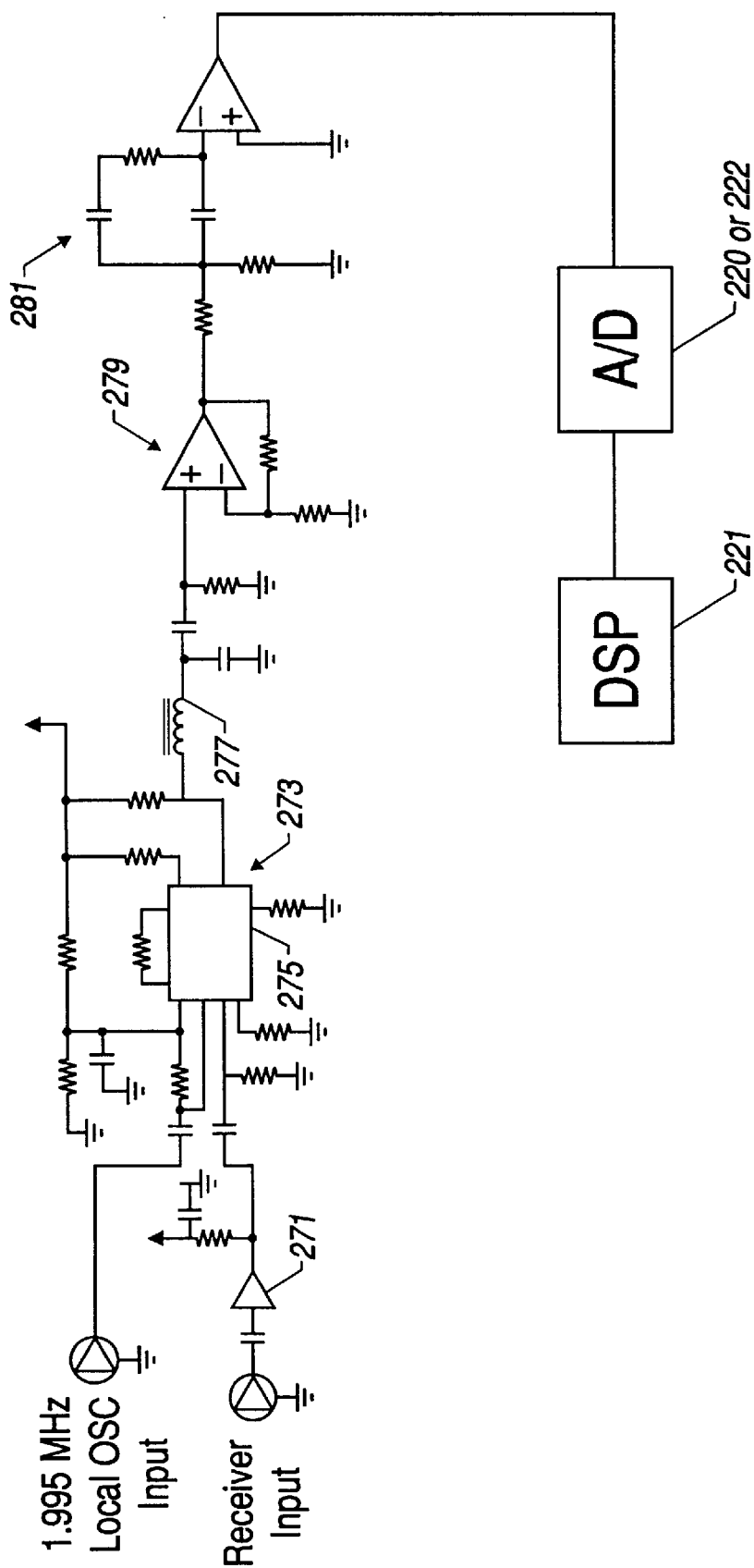
FIG. 4 is a circuit diagram of a part of the invention.

Reference is now made to FIG. 4. The overall function of the circuitry depicted in block diagram and schematic form in FIG. 4 is to respond to the local oscillator signal and one of the two receiver coil output signals to produce a receiver phase output signal relative to the transmitter and a receiver amplitude output signal. A conventional pre-amp circuit generally indicated at 271 responds to the receiver pick-up signal and its output is applied to a mixer circuit arrangement generally indicated at 273. Mixer circuit arrangement 273 includes an integrated circuit 275 that suitably is implemented by an integrated circuit manufactured and sold by Motorola and other companies under the designation MC 1596.

Because the frequency of the pick-up signal and the local oscillator signals are phase-locked to a common frequency reference and differ by 6 KHz, the intermediate frequency (IF) produced by mixer circuit arrangement 273 is at 6 KHz. A band pass circuit tuning circuit arrangement generally indicated at 277 passes the 6 KHz IF signal to an amplifier circuit arrangement generally indicated at 279. An active band pass filter circuit arrangement generally indicated at 281 provides further band pass filtering and provides a signal to an analog-to-digital converter, which supplies a digital input to a particular input channel of digital signal processor 221 (of FIG. 3).

Figure 5:
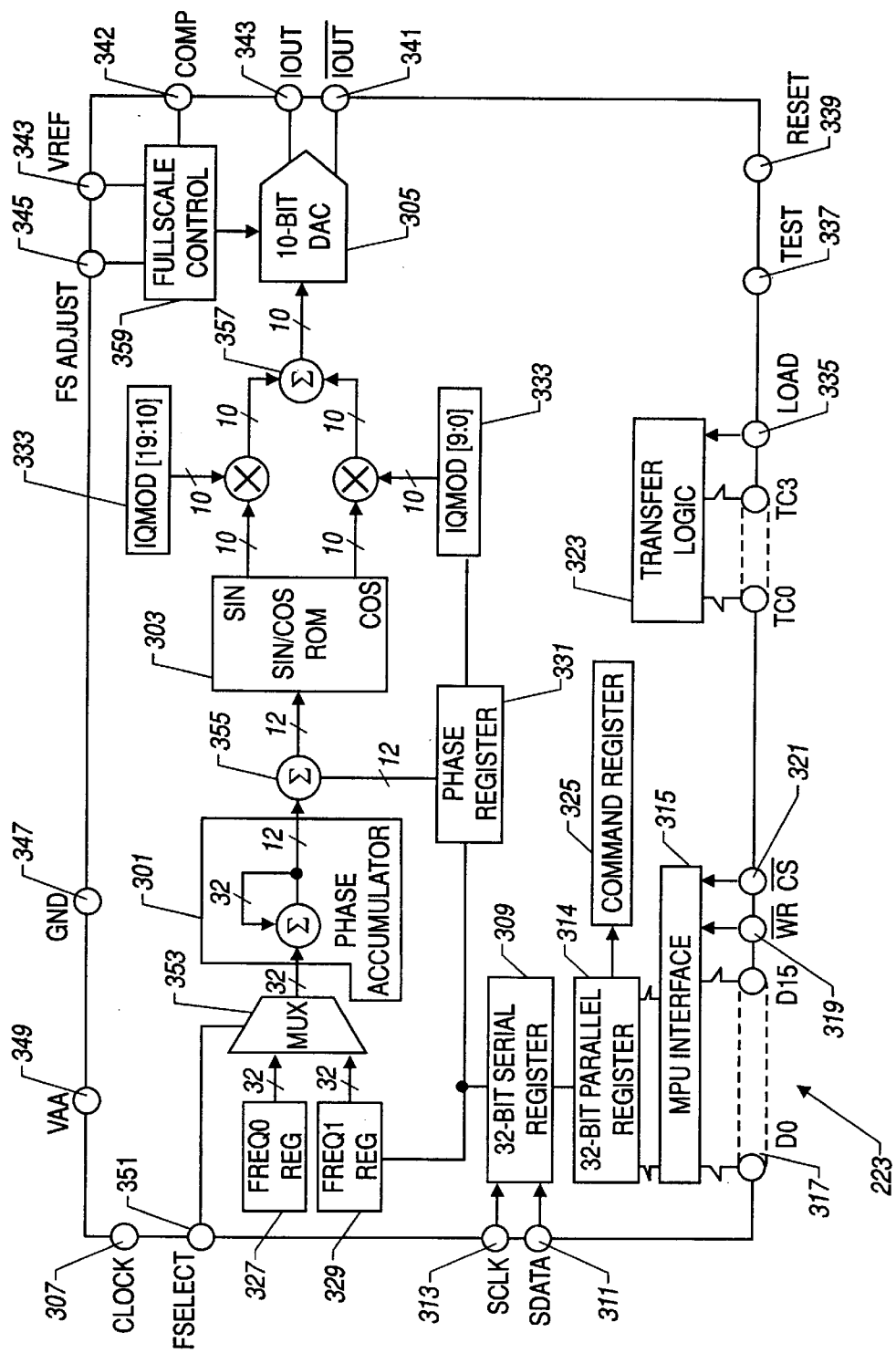
FIGS. 5A and 5B show block diagrams of the oscillator of FIG. 3.

FIGS. 5A and 5B are block diagram views of the numerically-controlled oscillators 223, 225, 233 of FIG. 3. Since the numerically-controlled oscillators are identical, only numerically-controlled oscillator 223 will be discussed and described. In the preferred embodiment of the present invention, numerically-controlled oscillator 223 comprises a CMOS, ODS modulator manufactured by Analog Devices of Norwood, Mass., which is identified by Model No. AD7008. The numerically-controlled oscillator 223 includes a thirty-two bit phase accumulator 301, a sine and cosine look-up table 303, and a ten-bit digital to analog converter 305. Clock input 307 is provided to receive a clocking signal from a device which is external to the numerically-controlled oscillator 223. The particular numerically-controlled oscillator of the present invention is adapted to accept clock rates as high as twenty MHz to fifty MHz, but can accommodate much lower clock rates. The device purports to have a frequency accuracy which can be controlled to one part in four billion. Numerically-controlled oscillator 223 includes a thirty-two bit serial register 309 which receives serial data at serial data input pin 311, which is clocked into the register in accordance with a clock signal which is supplied to serial clock input 313. A thirty-two bit parallel register 314 is also provided which receives parallel binary data from MPU interface 315. Data bus 317 includes sixteen digital input pins identified as D0 through D15. The chip select pin 321 is utilized when writing to the parallel register 314. The write pin 319 is also utilized when writing to the parallel register 309. The transfer control address bus 323 is utilized to determine the source and destination registers that are used during a transfer. A source register can be either the parallel assembly register 314 or the serial assembly register 309. The destination register can be any one of the following registers: the command register 325, the FREQ0 register 327, the FREQ1 register 329, the phase register 331, the IQMOD register 333. The command register is written to only through the parallel assembly register 314. The contents of the command register determine the operating state of the numerically-controlled oscillator 223. In the preferred device utilized in the present invention, the command register is a four bit register. The content of this register determines the operating state of the numerically-controlled oscillator. During logging operations, the logging apparatus of the present invention is programmed to provide commands from processors 215, 217, 219 (of FIG. 3) with eight-bit commands, so the "CR0" bit is 0. Normal operation is desired, so the "CR1" bit is 0. In the present invention, amplitude modulation is bypassed, so the "CR2" bit is 0. In the present invention, the synchronizer logic is enabled, so the "CR3" bit is 0. The FREQ0 register 327 defines the output frequency of the numerically-controlled oscillator 223, when the FSELECT pin is 1, as a fraction of the frequency of the clock signal applied to dock pin 307. The FREQ1 register 329 defines the output frequency of the numerically-controlled oscillator 223, when FSELECT equals 1, as a frequency of the clock signal applied to clock pin 307. The contents of the phase register 331 are added to the output of the phase accumulator 301. The IQMOD register 333 is not utilized in the present invention.

The operations can be performed with the registers by supplying command signals to transfer control address bus 323. Three basic operations can be performed. The contents of the parallel assembly register 314 can be transferred to command register 325; the contents of the parallel assembly register can be transferred to a selected destination register; and the contents of the serial assembly register 309 can be transferred to a selected destination register.

The load register pin 335 is utilized in conjunction with the transfer control address bus 323 to control loading of internal registers from either the parallel or serial assembly registers 309, 314. The test pin 337 is utilized only for factory testing. The reset pin 339 is utilized to reset the registers. The reset pin in particular is utilized to clear the command register 325 and all the modulation registers to 0. The current output pins 341, 343 are utilized to supply an alternating current to a selected end device. In the particular embodiment of the present invention, only one of these outputs is utilized for a particular transmitting antenna, since one current is the compliment of the other current. The compensation pin 342 is utilized to compensate for the internal reference amplifier. The voltage reference pin 343 can be utilized to override an internal voltage reference, if required. The full-scale adjust pin 345 determines the magnitude of the full scale current at output pins 341, 343. The ground pin 347 provides a ground reference, while the positive power supply pin provides power for the analog components within numerically-controlled oscillator 323. The frequency select pin 351 controls frequency registers FREQ0 register 327 and FREQ1 register 329, by determining which register is used in the phase accumulator 301 by controlling multiplexer 353. The contents of phase register 331 are added to the output of phase accumulator 301 at summer 355. The IQMOD registers 333 are provided to allow for either quadrature amplitude modulation or amplitude modulation, so the sine and cosine outputs of look-up table 303 are added together at summer 357, and are unaffected by the IQMOD registers 333. The output of summer 357 is provided to digital-to-analog converter 305, which creates an analog signal having a frequency which corresponds to either the contents of the FREQ0 register 327 or the FREQ1 register 329, a phase which is determined by the output of summer 355 which is provided as an input to look-up table 303, and an amplitude which Is determined by full scale control 359 which is set by full scale adjust pin 345 and reference voltage pin 343. Therefore, the numerically-controlled oscillator of FIGS. 5A and 5B can provide an analog output having a precise frequency attribute, phase attribute, and amplitude attribute. Since the device is extremely accurate, it is possible to provide a driving current for the transmitting antennas 203, 205, 207, 209 of FIG. 3 which is controlled precisely. In the preferred embodiment of the present invention, one of transmitting antennas 203, 205 is operated at 400 kHz, while the other of transmitting antennas 203, 205 is operated at 2 MHz. The same is true for antennas 207, 209, with one being operated at 400 kHz and the other being operated at 2 MHz. However, the processors 215, 217, 219 can be programmed to provide any particular frequencies for the transmitting antennas. This will be used to good advantage as will be described below in connection with a calibration routine.

In operation, a command signal is supplied to the FSELECT pin 351 to determine which frequency will be utilized for energizing a particular transmitting antenna. The FREQ0 register 327 and FREQ1 register 329 may be preloaded with two particular frequencies (such as 400 kHz and 2 MHz). The binary signal applied to the FSELECT pin 351 determines the operation of multiplexer 353, which supplies the contents of either FREQ0 register 327 or FREQ1 register 329 of the input of phase accumulator 301. Phase accumulator 301 accumulates a phase step on each clock cycle. The value of the phase step determines how many clock cycles are required for the phase accumulator to count $2\pi$ radians, that is, one cycle of the output frequency. The output frequency is determined by the phase step multiplied by the frequency of the signal applied to the clock input pin 307 divided by $2^{32}$. In practice, the phase accumulator 301 is cleared, then loaded with the output of multiplexer 353. Then, a predefined time interval is allowed to pass, during which the signal applied to clock input pin 307 steps the output of phase accumulator 301 through an incrementally increasing phase for the particular frequency. In other words, the phase accumulator steps from 0° phase to 180° for a particular frequency. At any time, the output of phase accumulator 301 may be altered by a phase offset which is supplied by phase register 331. Phase register 331 may be loaded in response to commands from processors 215, 217, 219. The phase value is supplied as input to look-up table 303, which converts the output of the phase accumulator 301 (and any desired offset) into a digital bit stream which is representative of an analog signal. This digital bit stream is supplied as an input to the 10-bit digital-to-analog converter 305 which also receives amplitude information from full scale control 359. The digital-to-analog converter 305 supplies an analog output with a particular frequency attribute, phase attribute, and amplitude attribute. For example, an output of 2 MHz, with 15° of phase, and a particular peak amplitude current may be provided as an input to a particular transmitting antenna.

Figure 6:
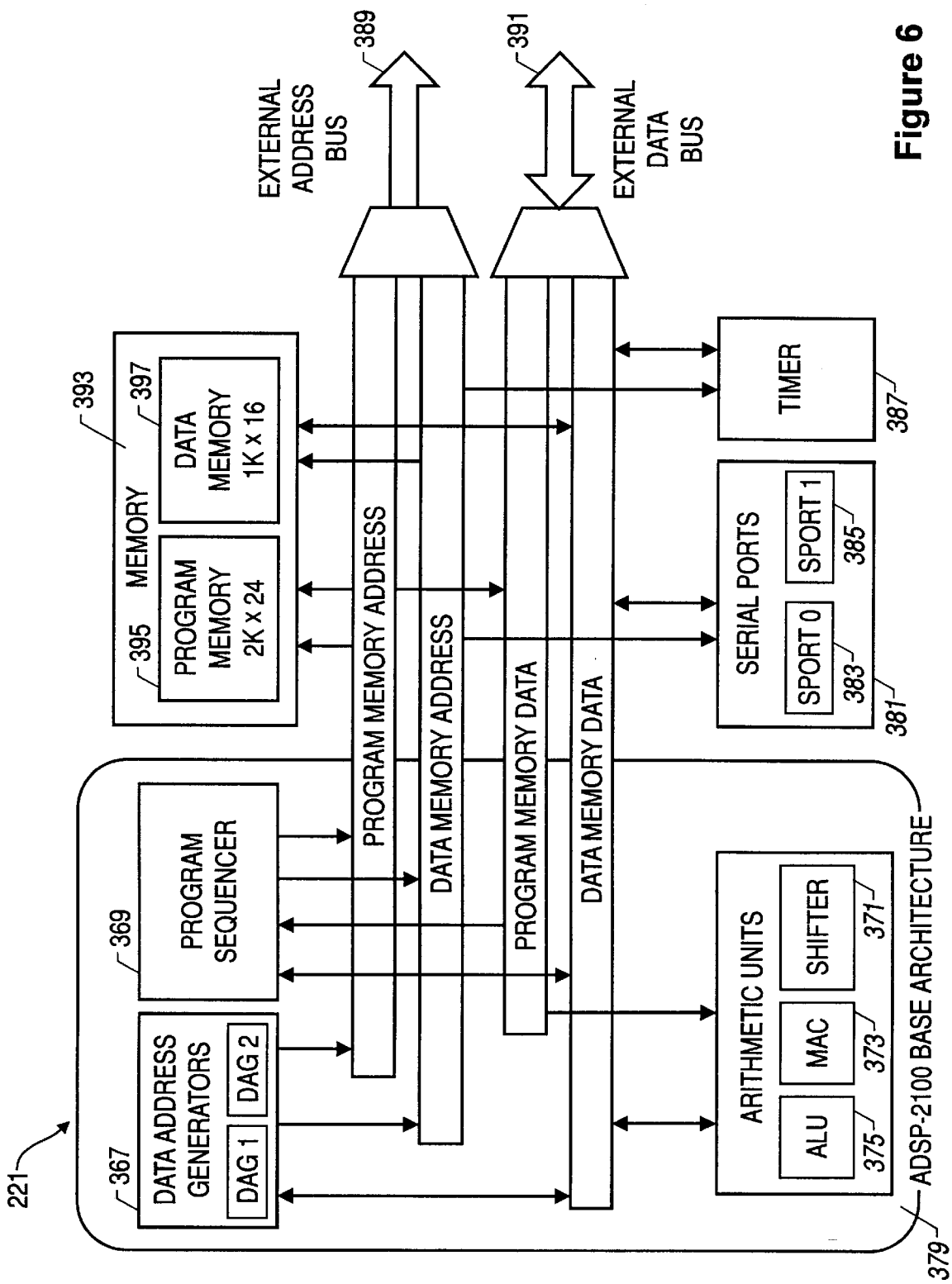
FIG. 6 is a block diagram of the digital signal processor of FIG. 3.

FIG. 6 is a block diagram view of the digital signal processor 221 of FIG. 3. In the preferred embodiment of the present invention, digital signal processor 221 comprises a DSP microcomputer manufactured by Analog Devices of Norwood, Mass., which is identified as Model No. ADSP-2 101. This is a single chip microcomputer which is utilized for high-speed numeric processing applications. Its base architecture 379 is a fully compatible superset of the ADSP-2 100 instruction set. The base architecture includes three independent computational units: shifter 371, multiplier/accumulator 373, and arithmetic and logic unit (ALU) 375. Program sequencer 389 supports a variety of operations including conditional jumps, subroutine calls, and returns in a single cycle. Data address generator 367 includes two address generators. Digital signal processor 221 includes serial port 381 which includes two input channels: input channel 383, and input channel 385. Timer 387 provides timing signals for the data processing operation, and receives as an input a clock signal from divide-by circuit 239 (of FIG. 3). External address bus 289 and external data bus 391 allow digital communication between digital signal processor 221 and central processor 315 of FIG. 6. Memory 393 includes program memory 395 and data memory 397. As is typical with digital signal processors, data memory 397 defines at least two circular buffers associated with serial ports 383, 385, which are designed to receive asynchronous digital data, and store it indefinitely or for a predetermined time interval. The digital signal processor 221 receives digital inputs at channel inputs 383, 385 from an analog-to-digital converter, such as is depicted in the circuit of FIG. 6. The receiving circuit of FIG. 6 receives a current which is representative of the response of a particular receiving antenna 211, 213 to electromagnetic radiation propagating through the borehole. This electrical signal is processed through the circuit components of FIG. 6, and is provided as an input to digital signal processor 221. In the preferred embodiment of the present invention, receiving antenna 211 is identified with a particular input channel of digital processor 221, while receiving antenna 213 is identified with the other input channel of digital signal processor 221. Central processor 215 (of FIG. 3) utilizes external address bus 389 and external data bus 391 to address a particular Input channel and read digital data into central processor 215 for processing. In the preferred embodiment of the present invention, digital signal processor 221 can sample data from receiving antennas 211, 213 at a very high sampling rate, which can be read periodically by central processor 215 which processes the data to determine the amplitude attenuation and phase shift of the electromagnetic signal which is propagated through the borehole. Central processor 215 can pull a selected amount of data from each channel of digital signal processor 221, and from that data calculate the amplitude attenuation and phase shift of the electromagnetic wave as it propagates through the wellbore and past receiving antenna 211 and receiving antenna 213. In the preferred embodiment of the present invention, an upper transmitter transmits an interrogating electromagnetic signal of a particular frequency which propagates downward past receiving antennas 211, 213. Then, a particular one of lower transmitting antennas 207, 209 propagate an interrogating electromagnetic signal upward. Measurements from receiving circuit 231 are stored in the input channels of digital signal processor 221, and read by central processor 215 in a manner which allows for the calculation of amplitude attenuation and phase shift.

Another important feature of the present invention arises from the fact that a precise energizing current can be utilized to energize a particular one of transmitting antennas 203, 205, 207, 209. This will establish the frequency attribute, phase attribute, and amplitude attribute of the electromagnetic interrogating signal. Therefore, a single receiving antenna can be utilized to make the measurement of the electromagnetic interrogating signal as it passes through the wellbore. The amplitude and phase of that interrogating signal can be recorded in memory, and compared with values in memory for the energizing current. This allows a single receiving antenna to be used to provide an accurate measure of amplitude attenuation between that particular receiving antenna and the particular transmitting antenna, and the phase shift of the interrogating signal between the transmitting antenna and the receiving antenna. Of course, the amplitude attenuation and phase shift of the electromagnetic interrogating signal as it passes through the formation is indicative of the resistivity of the wellbore and surrounding formation.

Figure 7A:
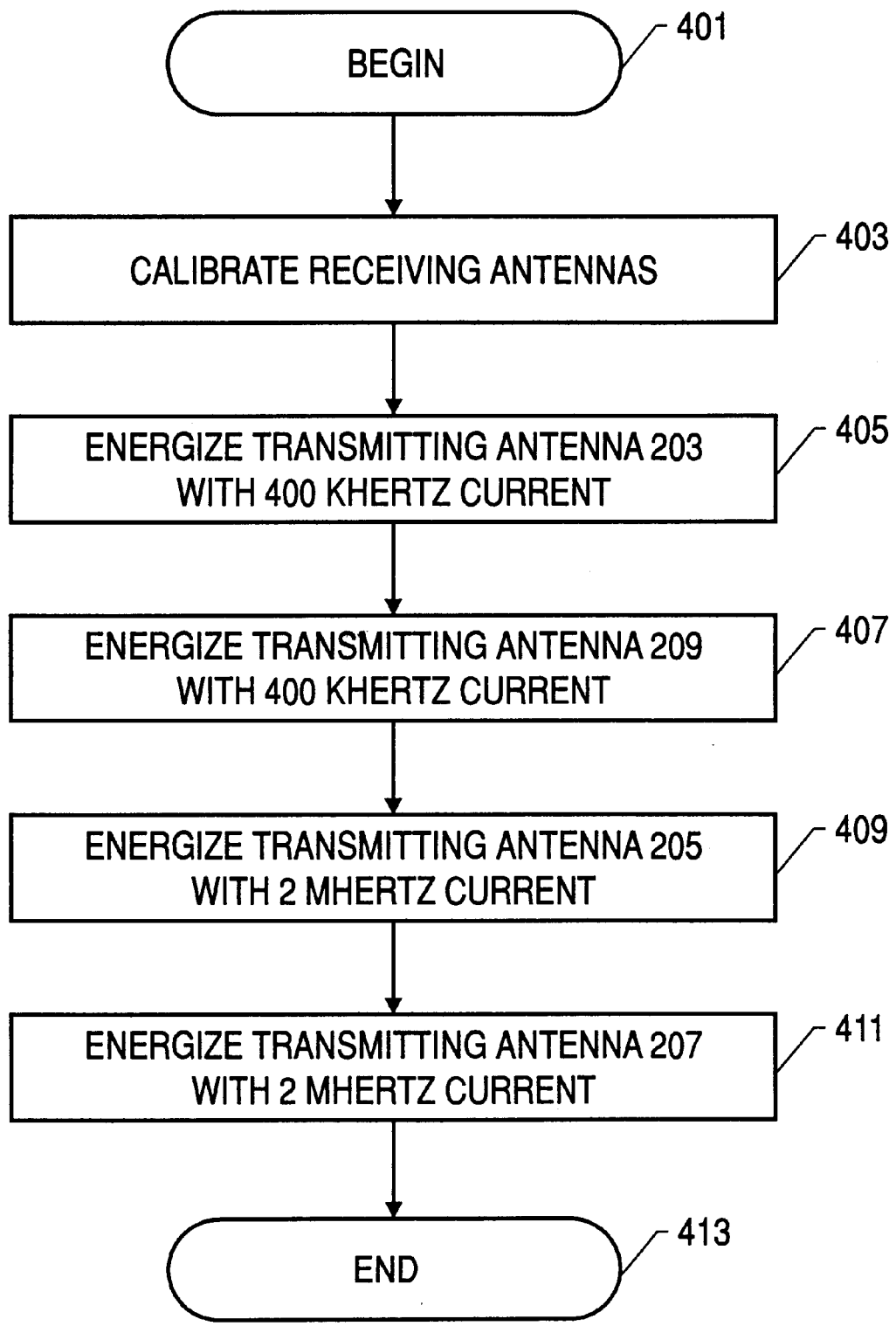
FIG. 7A 7B and 7C provide flowchart representations of the logging operations performed in the preferred embodiment.
Figure 7B:
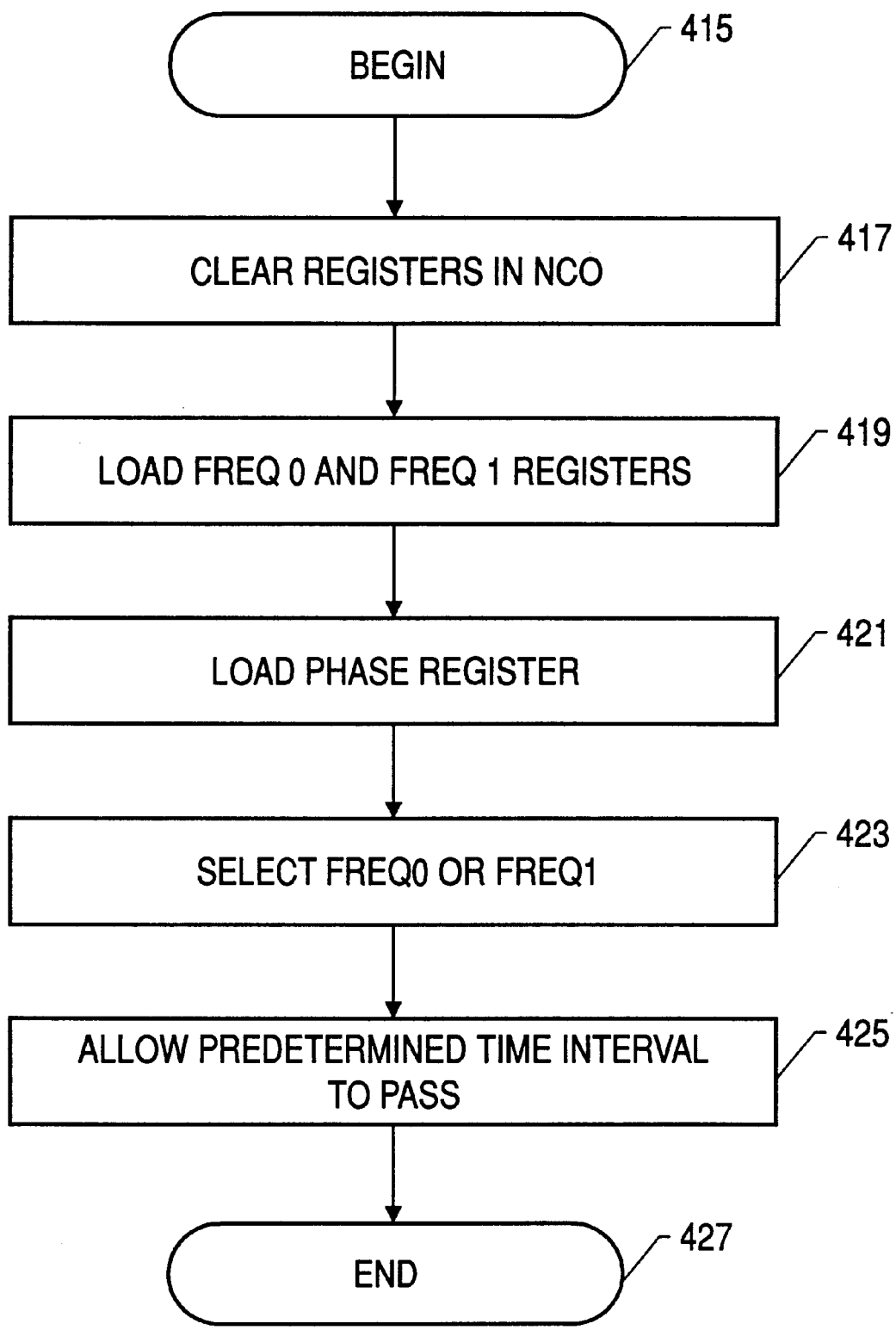
Figure 7C:
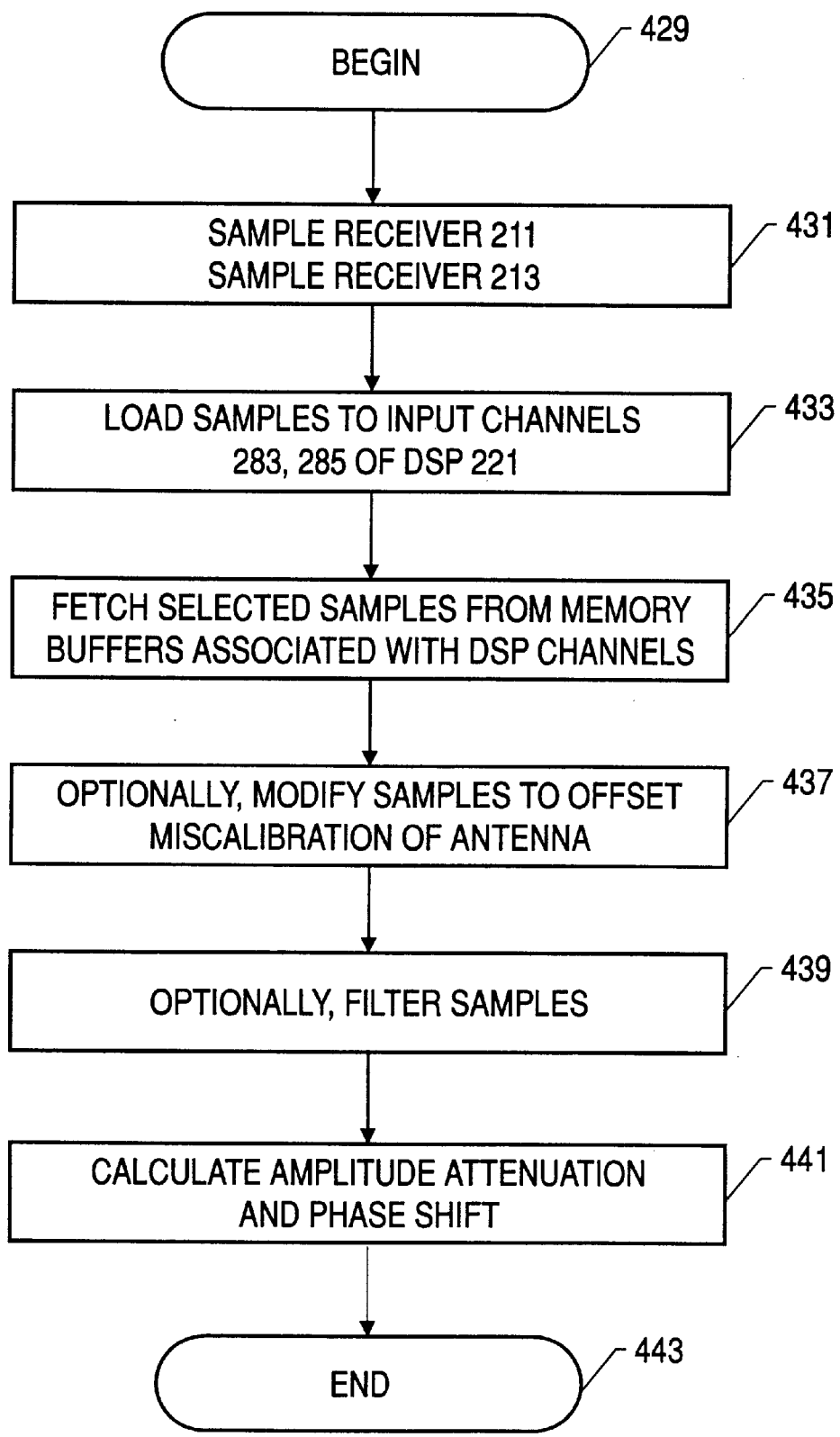

FIGS. 7A, 7B, and 7C provide high level flowchart representations of logging operations performed in accordance with the preferred embodiment of the present invention. FIG. 7A depicts logic steps which are performed by central processor 215. FIG. 7B represents operations controlled by processors 217, 219. FIG. 7C depicts operations controlled by digital signal processor 221 and central processor 215. The transmission operations begin at block 401. Processor 215 performs a calibration operation upon receiving antennas 211, 213. After the calibration operations are performed central processor 215 instructs processor 217 to energize transmitting antenna 203 with a 400 kHz current. Then, in accordance with block 407, central processor 215 instructs processor 219 to energize transmitting antenna 209 with a 400 kHz current. Next, central processor 215 instructs processor 217 to energize transmitting antenna 205 with a 2 MHZ current, in accordance with block 409. Then, in occurrence with block 411, central processor 215 instructs processor 219 to energize transmitting antenna 207 with a 2 MHZ current. The process stops at block 413.

In actual practice, transmission operations will be performed continuously over predefined intervals.

FIG. 7B depicts the control operations performed by processors 217, 219 to cause numerically controlled oscillators 223, 225 to energize particular transmitters. The process begins at block 415. It continues at block 417, wherein the processor 217 or 219 clears the registers in numerically controlled oscillators 223 or 225 by providing the appropriate instruction. Then, in accordance with block 419, processor 217 or 219 loads a predetermined value to the FREQ0 register and the FREQ1 register. These values determine the frequency of the energizing current which is supplied to a particular transmitting antenna. Then, in accordance with block 421, processor 217 or 219 loads a predetermined phase value to the phase register of numerically controlled oscillator 223 or 225. Processor 217 or 219 then provides a binary command to the FSELECT input pin of numerically controlled oscillator 223 or 225 to select a particular frequency of operation. Then, in accordance with block 425, a particular time interval is allowed to pass. This time interval determines how many cycles of energizing current are applied to a particular transmitting antenna. The process ends at software block 427. Typically, each time processor 217 or 219 is instructed by central processor 215 to energize a particular transmitting antenna, the steps of FIG. 7B are performed.

FIG. 7C depicts in flowchart for the reception operations. The process begins at block 429. The process continues at block 431, wherein the current within receiving antennas 211, 213 are sampled by receiving circuit 231. Then, in accordance with block 433, these samples are loaded to the appropriate input channels 283, 285 of digital signal processor 221. In accordance with block 435, central processor 215 fetches selected samples from the memory buffers associated with the digital signal processor input channels. In accordance with block 437, optionally, samples may be modified to offset for error components due to "miscalibration" of the antenna. Next, in accordance with software block 439, the digital samples may be digitally filtered with either a low-pass digital filter, high-pass digital filter, or a bandpass digital filter. Alternatively, the samples can be averaged over predefined intervals to provide stability to the samples and eliminate the influence of spurious or erroneous samples. Next, in accordance with block 441, the amplitude attenuation and phase shift are calculated, as is described elsewhere in this application. Finally, the process ends at block 443.

In one embodiment of the invention, the central processor 215 also has the mathematical model relating the parameters of interest to the measurements stored in a memory (not shown). The central processor 215 is also adapted to perform the necessary calculations for the solution of equations 5–9 and storing the resulting solutions in the memory of the central processor 215.

EXAMPLES OF RESULTS OF USING THE INVENTION

Figure 8:
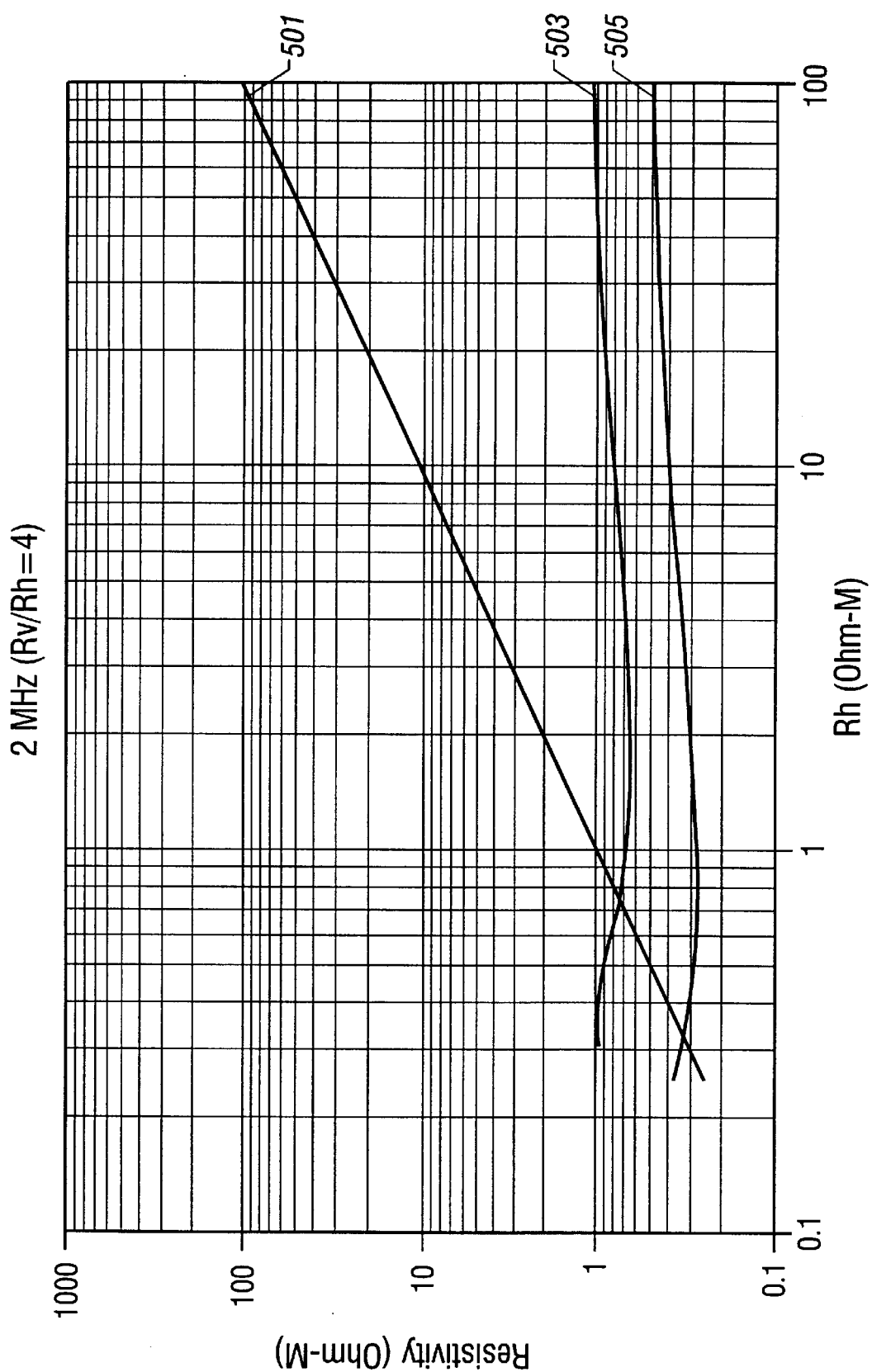
FIG. 8 is an illustrative example of the use of the present invention.

FIG. 8 shows some results of using the steps shown in FIG. 3 on simulated data. These simulated data were generated for a frequency of 2 MHZ for a ratio of $\sigma_h/\sigma_v$ of 4.0 and a $\theta$ of 80°. Curves 501 and 503 show the solution of equations 5–9 for the horizontal resistivity $R_h$ for the long spacing tool where the transmitter to receiver distances are 31" and 39". It can be clearly seen that for the range of values of $R_h$ used in the simulation, two solutions exist. illustrating the nonuniqueness of the solution of the equations. One of these, 501, is the correct solution, i.e., that which was used to generate the simulated data: the solution (ordinate) is the same as the actual value used to generate the simulated data (the abscissa). The other solution is clearly not what was used to generate the simulated data. However, when simulated data from the short spacing tool (transmitter to receiver distances of 19" and 27") are analyzed, the resulting solution is given by curves 501 and 505. Using the combination of the short spacing and the long spacing, the correct solution corresponding to 501 can be uniquely identified. Comparable results are obtained for the vertical resistivity (not shown).

As noted above with respect to the discussion on equation 12, an improved estimate of the parameter is obtained as a weighted sum of the individual estimates, the improved estimate having being more reliable than the individual estimates themselves.

What is claimed is:

1. A method for determining a plurality of parameters of interest of an anisotropic formation comprising:
   (a) conveying an electromagnetic wave propagation device in a borehole in the anisotropic formation, said device having a plurality of spaced apart receivers and transmitters;
   (b) inducing electromagnetic radiation in the formation by energizing at least one transmitter;
   (c) defining at least two parameters of interest to be determined, one of said parameters of interest to be determined being the horizontal wave number of the induced electromagnetic radiation;
   (d) obtaining at least three predefined measurements at said plurality of receivers;
   (e) defining a model that relates the at least three measurements to the at least two parameters of interest to be determined;
   (f) determining ambiguous values of the at least two parameters of interest by utilizing the at least three measurements and the model; and
   (g) determining an unambiguous value of the at least two parameters of interest from said ambiguous values.

2. The method of claim 1 wherein the at least two parameters of interest comprises a horizontal resistivity of the formation.

3. The method of claim 2 wherein the at least two parameters of interest further comprises a second parameter selected from: (i) horizontal dielectric constant of the formation, (ii) vertical resistivity of the formation, and (iii) vertical dielectric constant of the formation.

4. The method of claim 3 wherein the model is a CRIM model.

5. The method of claim 1 wherein the at least three measurements are comprised of measurements at at least two frequencies.

6. The method of claim 1 wherein the at least three measurements are comprised of measurements made using at least two different transmitter-to-receiver distances.

7. The method of claim 1 wherein the anisotropic formation is transversely isotropic.

8. A method for determining parameters of interest of an anisotropic formation comprising:
   (a) conveying an electromagnetic wave propagation device in a borehole in the anisotropic formation, said device having a plurality of spaced apart receivers and transmitters;
   (b) inducing electromagnetic radiation in the formation by energizing at least one transmitter;
   (c) defining at least two parameters of interest to be determined, one of said parameters of interest to be determined being the horizontal wave number of the induced electromagnetic radiation;
   (d) obtaining at least three predefined measurements at said plurality of receivers;
   (e) defining a model that relates the at least three measurements to the at least two parameters of interest to be determined;
   (f) determining multiple values of the at least two parameters of interest and errors associated with said determined values; and
   (g) combining said determined multiple values to give more reliable values of the parameters of interest.

9. The method of claim 8 wherein the at least two parameters of interest comprises a horizontal resistivity of the formation.

10. The method of claim 9 wherein the at least two parameters of interest further comprises a second parameter selected from: (i) horizontal dielectric constant of the formation, (ii) vertical resistivity of the formation, and (iii) vertical dielectric constant of the formation.

11. The method of claim 8 wherein the model is a CRIM model.

12. The method of claim 8 wherein the at least three measurements are comprised of measurements at at least two frequencies.

13. The method of claim 8 wherein the at least three measurements are comprised of measurements made using at least two different transmitter-to-receiver distances.

14. The method of claim 8 wherein the anisotropic formation is transversely isotropic.

15. An apparatus for determining at least two parameters of interest of an anisotropic formation, comprising:
   (a) at least one transmitter for inducing electromagnetic radiation in the formation at at least one frequency;
   (b) at least one receiver for making measurements of the induced electromagnetic radiation in the formation;
   (c) a model that relates the at least two parameters of interest to the measurements of the induced electromagnetic radiation; and
   (d) a processor for processing said measurements using the model to give ambiguous values of the parameters of interest and determining therefrom an unambiguous value of the parameter of interest.

16. The apparatus of claim 15 wherein the at least two parameters of interest comprises a horizontal resistivity of the formation.

17. The apparatus of claim 16 wherein the at least two parameters of interest further comprises a second parameter selected from: (i) horizontal dielectric constant of the formation, (ii) vertical resistivity of the formation, and (iii) vertical dielectric constant of the formation.

18. The apparatus of claim 15 wherein the model is a CRIM model.

19. The apparatus of claim 15 wherein the at least three measurements are comprised of measurements at at least two frequencies.

20. The apparatus of claim 15 wherein the at least three measurements are comprised of measurements made using at least two different transmitter-to-receiver distances.

21. The apparatus of claim 15 wherein the anisotropic formation is transversely isotropic.

* * * * *